United States Patent [19]

Nash

[11] Patent Number: 4,509,493

[45] Date of Patent: Apr. 9, 1985

[54] SMALL ENGINE IGNITION SYSTEM WITH SPARK ADVANCE

[75] Inventor: Donald R. Nash, Berkey, Ohio

[73] Assignee: Allied Corporation, Morristown, N.J.

[21] Appl. No.: 619,979

[22] Filed: Jun. 13, 1984

[51] Int. Cl.³ ............................. F02P 3/08; F02P 3/06
[52] U.S. Cl. ..................................... 123/602; 123/418
[58] Field of Search ...................... 123/418, 599, 602

[56] References Cited

U.S. PATENT DOCUMENTS

| | | | |
|---|---|---|---|
| 3,484,677 | 12/1969 | Piteo | 322/91 |
| 3,948,239 | 4/1976 | Katsumata | 123/149 C |
| 4,036,201 | 7/1977 | Burson | 123/148 CC |
| 4,157,702 | 6/1979 | Ogasawala et al. | 123/149 C |
| 4,163,437 | 8/1979 | Notaras et al. | 123/148 E |
| 4,202,305 | 5/1980 | Wolf | 123/148 CC |
| 4,351,286 | 9/1982 | Aylott | 123/601 |
| 4,404,940 | 9/1983 | Sieja | 123/602 X |
| 4,404,952 | 9/1983 | Fujimoto et al. | 123/602 |
| 4,441,478 | 4/1984 | Fujimoto | 123/602 |

*Primary Examiner*—Tony M. Argenbright
*Attorney, Agent, or Firm*—James P. DeClercq; Russel C. Wells

[57] ABSTRACT

A capacitor-discharge magneto ignition system utilizes an E-shaped core and a time delay circuit to provide a step advance at a predetermined speed, the magnitude of the spark advance being a function of the spacing of the legs of the E-shaped core and the spacing of magnet pole pieces of a magnet-carrying flywheel. The waveform induced in the windings about the center leg of the E-shaped core has a first positive portion, a second negative portion and a third positive portion. The storage capacitor is charged during the second portion, and discharged through a switching means by a trigger signal derived during the third portion below a predetermined engine speed. A trigger signal is also derived from the first portion, and is ineffective at lower engine speeds, because the storage capacitor is not yet charged, but does energize a time delay means including a trigger signal shunting means which remains conductive for a predetermined time. At higher engine speeds, it is still conductive at the time of the third portion, so that the storage capacitor is not discharged until the following first portion, yielding a step advance of the angular difference between first and third positions.

10 Claims, 14 Drawing Figures

SMALL ENGINE IGNITION SYSTEM WITH SPARK ADVANCE

This application relates to the field of internal combustion engine ignition systems. In particular, the instant application relates to a small engine ignition system with electronic step spark advance.

BACKGROUND OF THE INVENTION

In the field of small engine ignition systems, there are several known methods of providing spark advance. Spark advance is desirable because it may be used to provide an ignition impulse which occurs at approximately top dead center of an engine piston, to allow easy starting of the engine, as well as to provide an advanced spark to increase the power available from the engine and avoid spark knock at higher engine speeds. It also increases the efficiency of the engine at operating speed.

There are several known ways of accomplishing spark advance in large and small internal combustion engines. Historically, there are spring loaded weights which rotate a breaker-point cam or a electronic-sensor trigger wheel with respect to a driven shaft in response to engine speed changes. Step advance in electronic or magneto ignition systems has been accomplished using a rotor with various arrangements of axial or radial apertures and projections which affect a magnetic field sensed by a pickup coil in different amounts at different engine speeds, or a plurality of trigger coils of different sensitivity which are effective to cause an ignition impulse at different engine speeds. This results in the generation of two separate ignition-triggering signals, one for a retarded ignition impulse, and one for an advanced ignition impulse, both following the charging of an energy storage device, such as a coil or capacitor. Ignition advance occurs when the first signal following the charging of the energy storage device is large enough to trigger the discharge of the energy.

Thus, the prior art either requires a mechanically-complex rotor, or the use of a device, such as a trigger coil, positioned a large number of angular degrees about a flywheel away from the circuit containing the energy storage device. This results in two packages, each requiring an air gap setting to a flywheel, with interconnecting wires, or a physically large package.

The instant invention overcomes these and other complexities and disadvantages of the prior art.

SUMMARY OF THE INVENTION

The instant invention is a capacitor-discharge magneto ignition system which incorporates ignition advance in response to flywheel rotational speed, with the entire circuit in one package of compact size, and all low-voltage windings, such as trigger and drive or charging windings on a single bobbin.

Thus, it is a first object of the invention to provide a magneto ignition system with step advance in a single compact package.

It is a first feature of the invention that all low-voltage windings are on a single bobbin, disposed about one leg of a stator core structure.

This is advantageous since no separate core need be provided for a trigger coil, with attendant difficulties in setting its angular position and spacing from the flywheel.

It is a second feature of the invention that the circuit used to change ignition timing relies on measuring the time between a first triggering waveform portion and a second triggering waveform portion, and blocks the triggering of an ignition impulse in response to the second triggering waveform, so that, based on engine speed, energy stored in an energy storage device during a charging waveform portion between the first and second triggering waveform portions may be delivered to an ignition coil either as a retarded impulse in response to the second triggering waveform portion or as an advanced ignition impulse in response to a first triggering waveform portion of a subsequent engine cycle.

It is thus a second advantage of the invention that only a small number of electronic components need be added to a capacitive-discharge ignition system to provide a stepped-type ignition advance.

It is a further advantage of the invention that the advance angle is a function of the spacing of core legs and magnet pole pieces, and thus not only requires no calibration, but is not significantly affected by temperature, airgaps or waveform amplitudes.

Therefore, it is a primary objective of the invention to provide an ignition system for an internal combustion engine having a rotatable flywheel means carrying a magnet means for providing a rotating magnetic field, which includes an E-shaped magnetic core mounted adjacent the flywheel, having a plurality of electrical windings including charging and trigger windings disposed about an intermediate leg, so that these coils induce a voltage waveform having a first and third portion with a first polarity and a second intermediate portion having a second polarity, and including ignition coil means and an energy storage means which is cyclically charged by the charging winding during the second portion further includes switching means interposed between the ignition coil and the energy storage means, the switching means being responsive to a predetermined voltage induced by the first or third portions of the voltage waveform for discharging the energy storage means into the ignition coil to provide an ignition impulse, the switching means having an input terminal for controlling it, and a shunting means connected to this input terminal for shunting a trigger signal provided by the trigger winding, the shunting means being resistively connected to a second energy storage means, the second energy storage means being connected to the trigger winding and being cyclically charged by the trigger winding. The shunting means has a threshold voltage and is rendered conductive when the voltage upon the second energy storage means exceeds a predetermined value, the second energy storage means cyclically discharging through the shunting means. Therefore, the second energy storage means is maintained at a voltage below the threshold voltage when the engine is operated below a predetermined rotational speed, the ignition impulse being provided during a third portion of the waveform, and the second energy storage means being maintained at a voltage above the threshold voltage during the second and third portions of the waveform when the engine is operated above a predetermined rotational speed, so that the ignition pulse is provided during a first waveform portion to provide an advanced ignition impulse, since the shunting means is conductive during the second and third portions of a first induced waveform and becomes nonconductive between a first of these waveforms and a second such waveform.

These and other objectives, features and advantages of the invention will become apparent from the detailed description which follows.

DETAILED DESCRIPTION OF THE INVENTION

Figure 1:
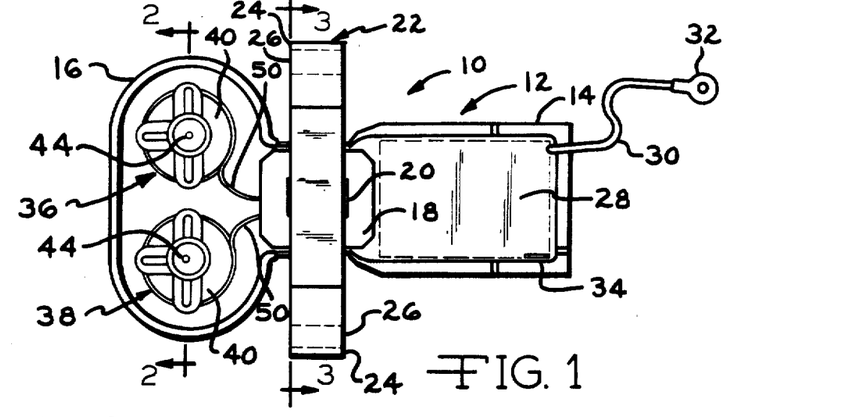
FIG. 1 is a top elevational view of a first preferred embodiment of the invention.

FIG. 1 shows ignition system 10 arranged in accordance with the preferred embodiment of the invention. A housing number 12 having a first end portion 14 and a second end portion 16 and supporting a first coil assembly shown symbolically on first coil form 18 disposed about a central leg 20 of a generally E-shaped stator core 22.

As illustrated, housing member 12 is nonsymmetrical, and E-shaped stator core 22 is provided with mounting protrusions 24 defining apertures 26. It will be apparent to one skilled in the art that the disclosed invention can be constructed in housings of various shapes, and mounted in a variety of ways, the ignition system being supported in proper position either by its housing or by its stator core, or by both.

As illustrated, first end portion 14 surrounds a circuit board 28, which contains all low-level electronic components used in the disclosed embodiment of the invention, and includes a ground lead 30 provided with a terminal 32, and a quick-connect tab or the like used as a stop tab, for connection to a stop switch for stopping the associated engine.

Second end portion 16, as illustrated, supports first and second ignition coils 36 and 38. The illustrated embodiment of the invention is intended for a multiple-cylinder engine, where simultaneous provision of ignition impulses to more than one cylinder is effective to cause combustion in each cylinder. The number of ignition coils provided is a matter of choice, as also is the incorporation of a distributor or the like.

Each ignition coil 36, 38 includes a suitable core contained within a bobbin 40 provided with a socket 42 for receiving the end of a conventional spark plug wire. A helical screw member 44 is provided for making connection with the spark plug wire, which is simply screwed or rotated into socket 42.

As will be apparent, each ignition coil, such as 36, 38 carries a primary winding 46 and a secondary winding 48. Ignition coils 36 and 38 are connected to circuit board 28 through wires 50. Only one conductor or wire is shown, for simplicity of illustration, although, as will be apparent, ignition coils have an autotransformer-type arrangement, so that either two or three interconnecting wires are necessary, depending on whether or not one end of the primary and secondary windings are connected together internal to or external from the ignition coil.

As will be apparent to one skilled in the art, although ignition coils 36, 38 are shown as being physically separated from stator core 22, they may, if desired, be mounted about a leg of stator core 22.

Portions 14 and 16 are filled with encapsulating compound, as is conventional.

Figures 2, 3:
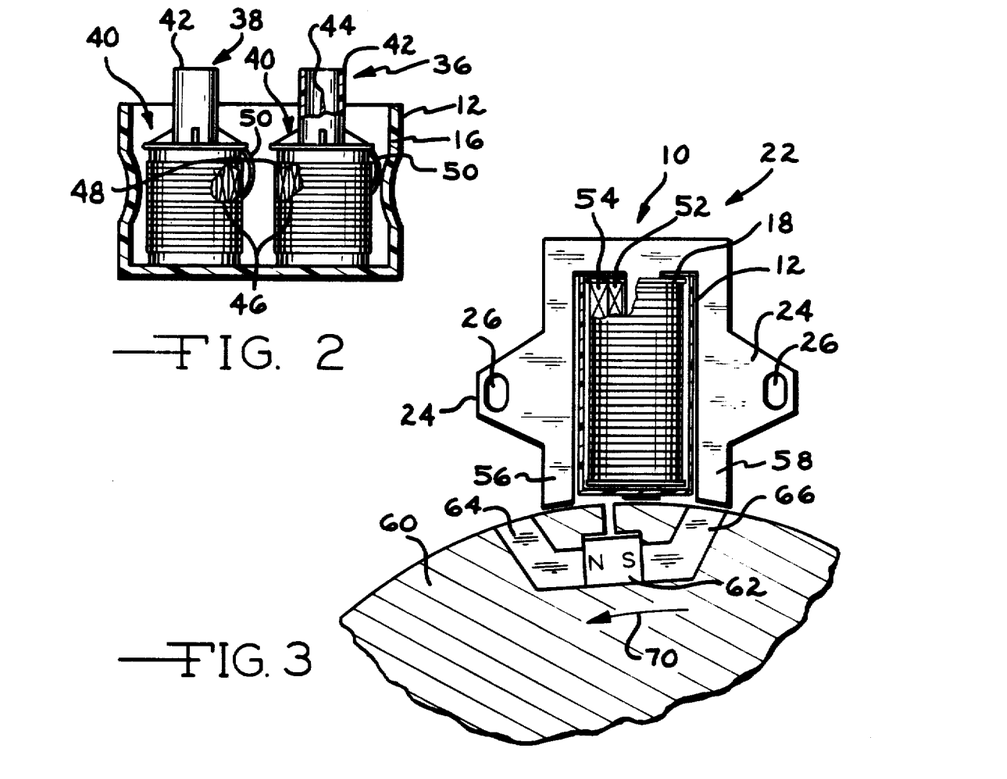
FIG. 2 is a sectional view taken along line 2—2 in FIG. 1.
FIG. 3 is a sectional view taken along line 3—3 in FIG. 1, and showing the ignition system disposed adjacent a magnet-carrying flywheel.
Figure 7:
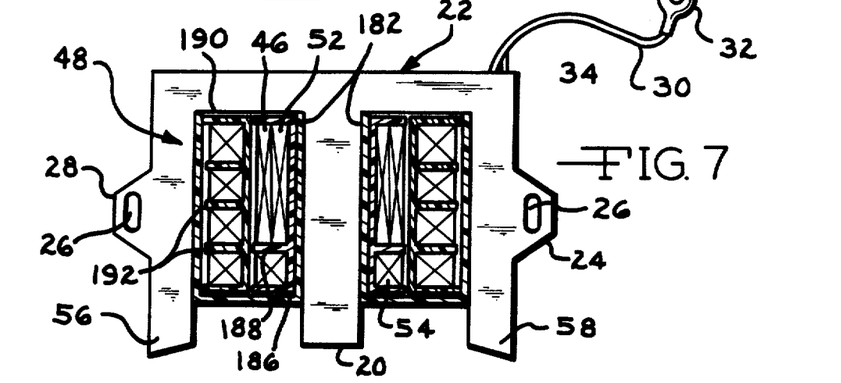
FIG. 7 is a sectional view of the second preferred embodiment of the invention, taken along line 7—7 in FIG. 5.

Turning to FIG. 3, it can be seen that, in the preferred embodiment of the invention, the first coil assembly shown symbolically on first coil form 18 carries a charging winding 52 and a trigger winding 54, concentrically disposed about central leg 20. The coils may also be arranged as shown in FIG. 7, if desired, for manufacturing convenience, since it may be desirable to separately wind charging and trigger coils, so that one coil can be modified as to wire size or number of turns without disturbing the other. As may be seen, central leg 20 is the second leg portion of the illustrated embodiment of the invention, and is disposed intermediate between first leg 56 and third leg 58. Legs 56, 20 and 58 are configured appropriately to conform to the circumference of a flywheel 60, carrying a magnet 62, mounted between a pair of pole shoes 64, 66. It will be apparent from this view that the ignition advance obtained from the instant embodiment of the invention is dependent on the relative spacing of the legs of E-shaped stator core 22 and the configuration of pole shoes 64, 66. Preferably, the flywheel remains unchanged, and the desired advance is obtained by modifying stator core 22, such as by spacing third leg 58 a greater distance from central leg 20, for a flywheel 60 rotating in direction 70. In a physical embodiment of the invention, for example, it was found that a symmetrical stator core 22 gave approximately a 20° ignition advance, core 22 then being modified as described to yield a 35° ignition advance.

As will be apparent, the rotation of flywheel 70 induces a wave form in winding 54 which has a first portion of a first polarity, a second portion of second polarity, and a subsequent third portion of first polarity.

Figure 9A:
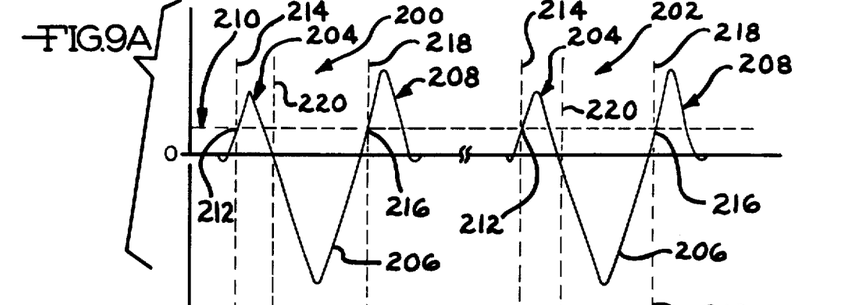
FIG. 9a shows the magnetically-induced voltage waveform of the invention.

This waveform is illustrated in FIG. 9a, described below.

Figure 4:
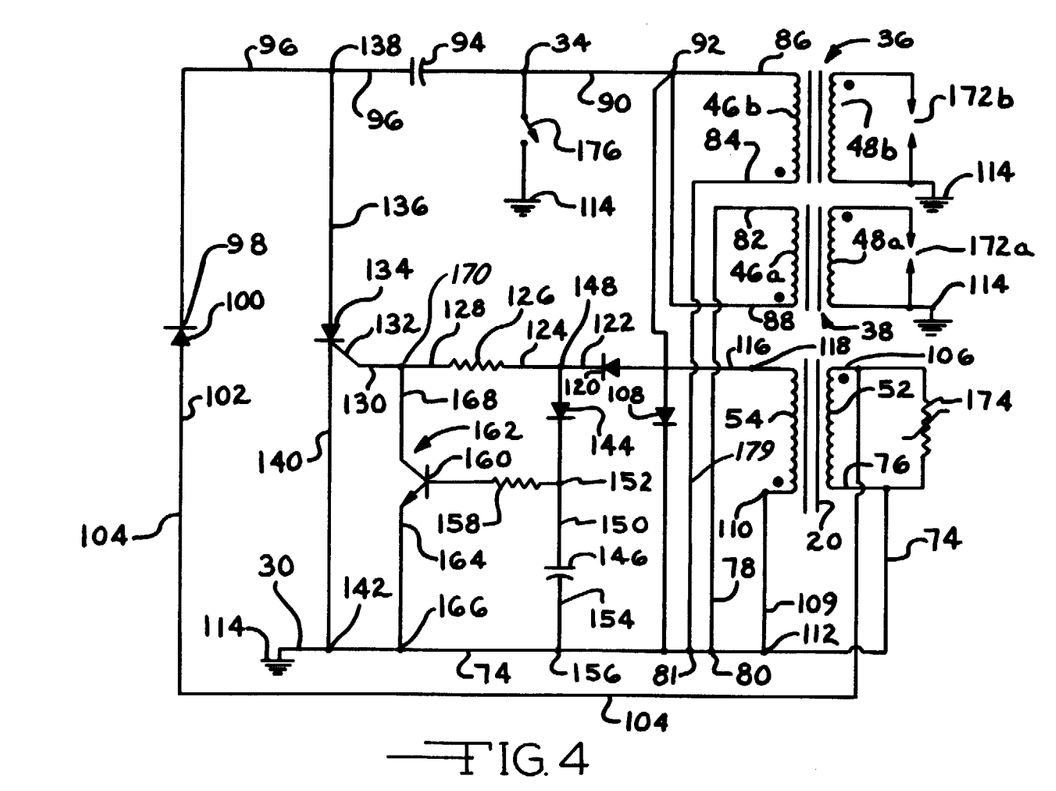
FIG. 4 shows a circuit diagram of the first preferred embodiment of the invention.

Turning now to FIG. 4, there is shown a circuit diagram of the illustrated embodiment of the invention.

It may be noted in conjunction with FIG. 4 that the preferred switching device is illustrated as a silicon controlled rectifier or SCR.

As shown in FIG. 4, charging winding 52 charges a capacitor or first energy storage means 94 in any convenient manner. Several methods of interconnecting a charging winding and a storage capacitor are known in the art. As illustrated, a line 74 is connected to a first end 76 of charging winding 52, and joins lines 78 and 79 at junctions 80 and 81. Lines 78 and 79 are shown as separate lines, but of course could be replaced by a single line or a branched line. Line 78 is shown connected to a first end 82 of a first ignition coil primary winding 46a, and line 79 is shown as connected to a first end 84 of a second ignition coil primary winding 46b. Second end 86 of winding 46b and second end 88 of winding 46a are joined to a line 90 at junction 92. Line 90 is connected to a first end of a first energy storage means shown as capacitor 94, which in turn has its second end connected to line 96. Line 96 is then connected to a first cathode end 98 of a diode 100. The second anode end of diode 100 is connected to a line 104, which is in turn connected to a second end 106 of charging winding 52. A diode 108 is connected across windings 46a and 46b, such as from junction 92 to line 74. Thus, capacitor 94 is charged by winding 52 through line 104, diode 100, line 96, line 90, junction 92, diode 108, and line 74.

A trigger signal is provided by winding 54, which has one end connected to a line 108 at a junction 110. Line 108 joins line 74 at junction 112. Line 74 is connected to ground 114 through ground lead 30. The opposite end of winding 54 is connected to a line 116 at junction 118. Line 116 is connected to the anode of a diode 120. The cathode of diode 120 is connected to a line 122, which is connected, in turn, to a first end 124 of a resistor 126. Second end 128 of resistor 126 is connected through a line 130 to a control terminal of a switching means, here shown as the gate terminal 132 of a silicon controlled rectifier 134. The switching means shown as silicon controlled rectifier 134 has controlled terminals in the form of an anode lead 136 connected to line 96 at junction 138 and a cathode lead 140 connected to line 74 at junction 142. Thus, when a trigger voltage is induced in winding 54, it flows through diode 120 and resistor 126 to control terminal 132, rendering the switching means illustrated as a silicon controlled rectifier conductive. The first energy storage means shown as capacitor 94 then discharges through line 96, silicon controlled rectifier 134, line 74, lines 78 and 79, windings 46a and 46b, and line 90.

In accordance with the invention, current produced by the trigger winding 54 and appearing at line 122 also flows through a diode 144 to charge a second energy storage means shown as capacitor 146. Diode 144 has its anode connected to line 122 at junction 148, and its cathode connected to a first terminal 150 of capacitor 146 at junction 152. Second terminal 154 of capacitor 146 is joined to line 74 at junction 156. Voltage appearing at junction 152 causes current to flow through a resistor 158 connected between junction 152 and a control terminal, shown as base lead 160 of a shunting means shown as transistor 162 and returns to line 74 through a first controlled terminal shown as emitter lead 164, connected to line 74 at junction 166. Second controlled terminal 168 of shunting means 162, shown as a collector lead, is joined to line 130 at junction 170. Thus, capacitor 146 is cyclically charged from trigger winding 54, and cyclically discharged through shunting means 162. As will be apparent, any device usable as shunting means 162 has a voltage or current threshold above which it is rendered conductive. For such devices with a high input impedance, to cyclically discharge capacitor 146, it would be necessary to add a resistor, not shown, between control terminal 160 and line 74 to provide a discharge path.

From the above, it will be seen that a trigger signal induced in winding 54 will not be effective to control switching means 134 if shunting means 162 is conductive, and that shunting means 162 will be conductive if insufficient time between cyclically-induced voltages in winding 54 have elapsed for capacitor 146 to discharge below the level which renders shunting means 162 conductive. Therefore, as will become more apparent from the description which follows, since the invention provides two potential trigger signals during each waveform induced by magnet 62 in flywheel 60, above a predetermined speed, determined largely by the ratio of capacitor 146 to resistor 158, an ignition impulse will not be provided in response to one potential trigger signal, but will be responsive to another trigger signal occurring at a time after capacitor 146 has discharged below the threshold level of shunting means 162, yielding an ignition advance.

When switching means 134 is rendered conductive, capacitor 94 discharges, causing current to flow through primary windings 46a, 46b of ignition coils 36, 38, causing a high voltage to be induced in secondary windings 48, 48b causing an ignition impulse across spark gaps or spark plugs 172a, 172b. As noted above, the number of ignition coils used, and whether or not they share a common core, is believed to be a design choice. If ignition coils share a common core with charging and trigger windings, the voltage dependent resistor 174 across winding 52 may be placed across any winding, since it has an effect similar to that of a shorted turn, and affects the output of all windings sharing a common magnetic path. For instance, if only one ignition coil were provided on a common magnetic core resistor 174 might desirably be placed across its primary winding, rather than as shown. Also, a means for stopping the associated engine may be operatively connected to or in any segment of the charge or discharge path of capacitor 94. In the illustrated embodiment, a stop switch 176 is connected between line 94 and ground 114 at stop tab 34, and prevents capacitor 94 from discharging through windings 46a, 46b by diverting the current to ground 114.

Turning now to FIGS. 5, 6, 7 and 8, there is illustrated a second preferred embodiment of the invention having all windings disposed around a common magnetic core. Reference numerals similar to those used in FIGS. 1-4 will be used in the description of FIGS. 5, 6 and 7, and the circuit diagram of FIG. 8, whenever possible.

Figure 5:
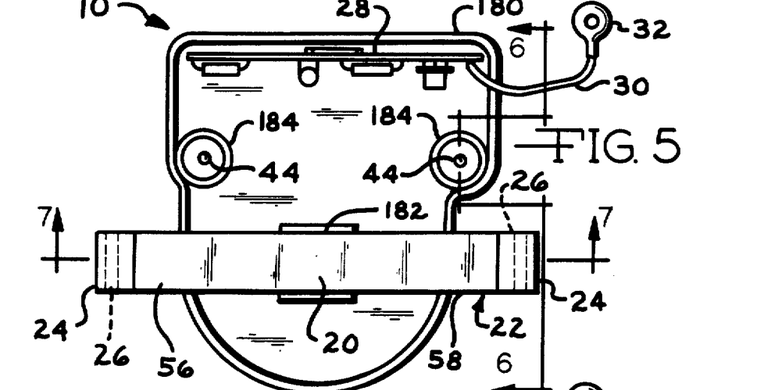
FIG. 5 is a top elevational view of a second preferred embodiment of the invention.

As shown in FIG. 5, housing member 180 is of a convenient shape to contain circuit board 28 and charge, trigger, primary and secondary windings. It is generally cup-shaped in configuration, and includes an upstanding portion 182 adapted to receive central or second leg 20 of E-shaped stator core 22. It is filled with encapsulating compound, as is conventional, after its various components and windings are inserted. Helical screw members 44, for making contact with an ignition cable, are each contained in a well 184, which receives the ignition cable, formed by inserting an appropriate slug of material over screw member 44 before pouring encapsulating compound into housing member 180, and removing the slug after the encapsulating compound has cured. Screw member 44 is, as before, connected to an ignition coil secondary winding.

As can be seen from FIG. 7, the four coils or windings, charge, trigger, primary and secondary are wound on two separate coil forms or bobbins. As illustrated, a first coil form or bobbin 186 has a wall portion 188 intermediate its end sections, separating a trigger winding 54 from a charging winding 52 and an ignition coil primary winding 46. Although shown overlaying one another, windings 46 and 52 may also be wound next to each other, or one of the two may be wound on a second coil form or bobbin 190, which has a plurality, here shown as three of wall portions 192 intermediate its end portions, defining a plurality of circumferential pockets into which secondary winding 48 is wound. Such a coil form or bobbin is of known usefulness for ignition secondary windings of the random-wound type. As will be obvious, there is a voltage of as much as thirty thousand to forty thousand volts between opposite ends of an ignition secondary winding. On a layer-wound core, the voltage difference between adjacent wires within a winding is relatively low. However, in random-wound coils, the voltage difference between adjacent wires may be quite high, leading to insulation breakdown and winding failure. The winding illustrated, sometimes called a segmented secondary, allows random winding of the secondary with confidence that adjacent wires will not differ too greatly in voltage. It is also common to use one of the several circumferential pockets in such a coil form of bobbin for a primary or other winding, and the remainder of the pockets for a secondary winding. The instant invention does not relate to any physical configuration or physical winding configuration, so that any convenient mechanical structure may be used.

Figure 6:
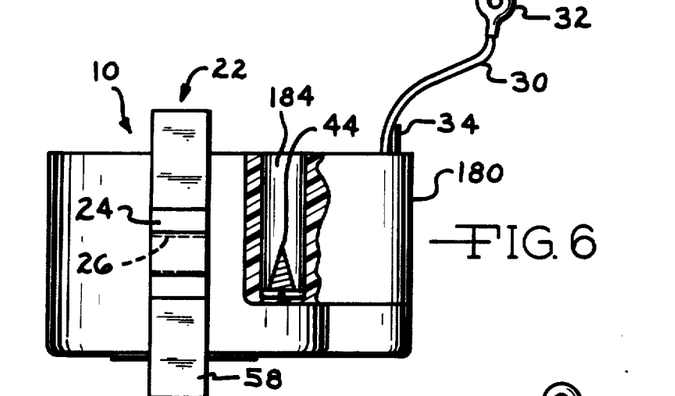
FIG. 6 is a side elevational view of the second preferred embodiment of the invention, partially in section taken along line 6—6 in FIG. 5.
Figure 8:
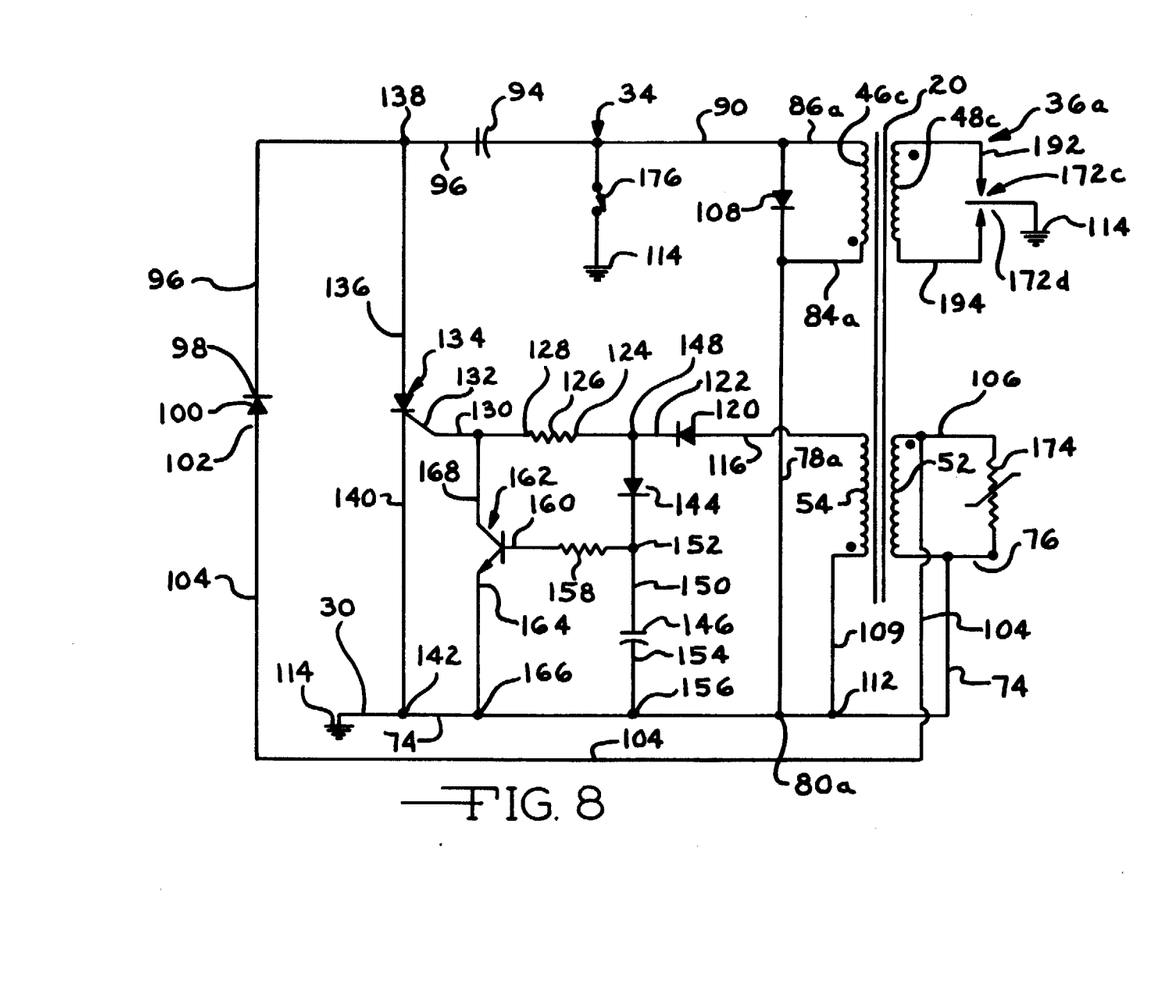
FIG. 8 shows a circuit diagram of the second preferred embodiment of the invention.

Turning now to FIG. 8, the circuit diagram of the embodiment of FIGS. 5, 6 and 7 is illustrated. As before, reference numerals consistent with those used for similar parts of the circuit diagram of FIG. 4 will be used when possible, since the fundamental differences between the circuit of FIG. 4 and FIG. 8 is that all coils or windings share a common core, and that a dual spark output is obtained with a single primary and secondary winding. The ignition system functions in exactly the same manner, and uses otherwise-identical components, connected in an electrically-equivalent configuration. Trigger winding 54, charge winding 52, primary winding 46c and secondary winding 48c share a common magnetic path defined by central leg 20. Therefore, the same induced wave form is induced in all windings, although ineffective to produce an ignition impulse in ignition primary or secondary windings. A diode 108 is connected between ends 86a and 84a of primary winding 46c, with its anode connected to end 86a and its cathode connected to end 84a. A voltage dependent resistor is shown connected across charge winding 52 to limit transient voltages.

As before, during a first portion of a first wave form, a voltage is induced in the trigger winding, and switching means 134 may be rendered conductive, an action which is of no consequence below a predetermined speed, since capacitor 94 will have been previously discharged. During a second portion of the first waveform, a voltage induced in charging winding 52 will flow through line 104, diode 100, and line 96 to charge capacitor 94. The circuit from capacitor 94 is completed to line 90, diode 108, line 78a, junction 80a and line 74. During a third portion of the first waveform, a trigger signal is again provided, and causes switching means 134 to become conductive, unless shunting means 162 is conductive. When switching means 134 becomes conductive, capacitor 94 discharges through line 96, switching means 134, line 74, line 78a, and ignition primary winding 46c. The circuit is completed through line 90 to capacitor 94.

As before, each trigger pulse also cyclically charges second energy storage means 146, which renders shunting means 162 conductive until capacitor 146 has discharged. Above a predetermined engine speed, the trigger signal induced by the first portion of the first waveform charges capacitor 146 and renders shunting means 162 conductive and, due to the speed of the associated engine, will still be conductive when a third portion of the first waveform occurs and generates a trigger voltage in winding 54. Thus, above a predetermined speed, no trigger signal will be provided to switching means 134, shunting means 162 being conductive. However, capacitor 94 remains charged, and ready to be discharged. It will be discharged by the first portion of a second subsequent induced voltage waveform, there having been adequate time for capacitor 146 to discharge. This produces an ignition advance based on the angular distance between the generation of first and third waveform portions of an induced voltage waveform.

As illustrated, the ignition impulse induced in secondary winding 48c appears substantially simultaneously at spark plugs or gaps 172c, between a first end 192 of winding 48c and ground 114, and at spark plug or gap 172d, between second end 194 of winding 48c and ground 114.

Turning now to FIG. 9, the three-portion voltage waveform produced by the invention is illustrated. Two cycles of the voltages induced in various parts of the disclosed embodiment of the invention by passage of a magnetic field, such as that of magnet 62 of flywheel 60 are illustrated. The waveform of FIG. 9 is somewhat stylized, in that the transient voltages caused by the delivery of an ignition impulse are omitted, and nonlinearities in waveforms which are not significant to the operation of the invention are not shown. As illustrated, each induced voltage waveform 200, 202 includes first portion 204 having a first polarity, a second portion 206 having a second polarity, and a third portion 208 having a first polarity. Portion 206 is a charging portion, which is used for charging a storage capacitance. In the case of a capacitive-discharge ignition system, such as the present invention, a trigger signal is derived from portion 208. Portions 204 of waveforms 200, 202 cross threshold 210 at points 212 at time 214. Similarly, portions 208 cross trigger level 210 at points 216, at time 218. Charging of the first energy storage means, capacitor 94, begins at time 220 substantially at the beginning of portion 206.

Figure 9B:
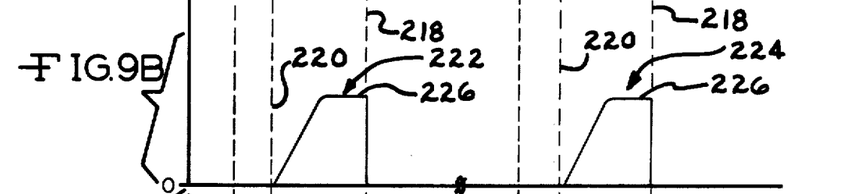
FIG. 9b illustrates the state of charge of the energy storage means of the invention with respect to the induced voltage waveform at an engine rotational speed below a predetermined value.

FIG. 9b illustrates the charge upon capacitor 94 when the associated engine is operating below a preselected rate of revolution, so that shunting means 162 is nonconductive at time 218. As shown, capacitor voltage waveforms 222, 224 show that capacitor 94 charges during portion 206 and maintains that charge, until it is discharged at time 216 to provide an ignition impulse.

Figures 9C, 9D:
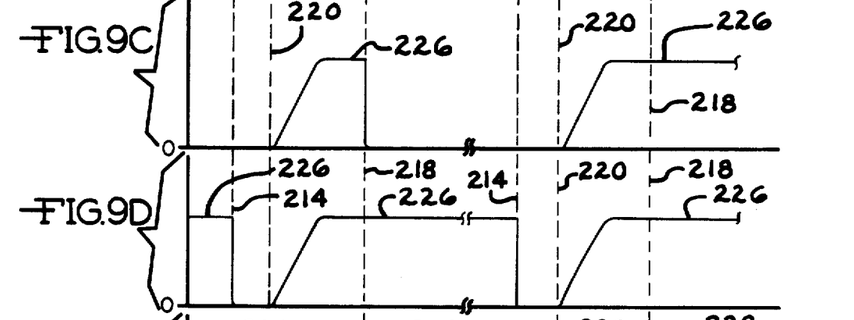
FIG. 9c shows the charge on the energy storage means at the predetermined engine speed value.
FIG. 9d shows the charge on the energy storage means of the invention at an engine speed above the predetermined value.

FIG. 9c illustrates the charge upon capacitor 94 when the associated engine is operated at an increasing rotational speed which passes through the preselected rotational speed, such that the engine speed during voltage waveform 202 is slightly higher than the engine speed during voltage waveform 200. As in FIG. 9b, the capacitor charge voltage rises to voltage level 276, and is discharged at time 218. However, the subsequent waveform 202 produces a capacitor charge voltage upon capacitor 94 which rises to voltage level 226, and is not discharged at time 218, but rather remains charged until the subsequent time 214, as shown in FIG. 9d.

FIG. 9d shows the charge upon capacitor 94 when the associated engine is operating above the predetermined rotational rate. As in the second waveform of FIG. 9c, capacitor 94 is charged to voltage level 226, and is not discharged at time 218, but is rather discharged, providing an ignition impulse, at the next occurrence of time 214. It will be apparent that an ignition impulse is thus omitted in the process of switching to ignition advance. This is not significant due to the inertia of the associated engine, and the fact that a small percentage of misfires normally occur during the operation of an engine without noticeable detrimental effect. In the preferred embodiment of the invention, times 214 and 218 are approximately 35 angular degrees apart, producing a 35° spark advance at the predetermined speed set mainly by the ratio of capacitor 146 to resistor 158.

Figure 9E:
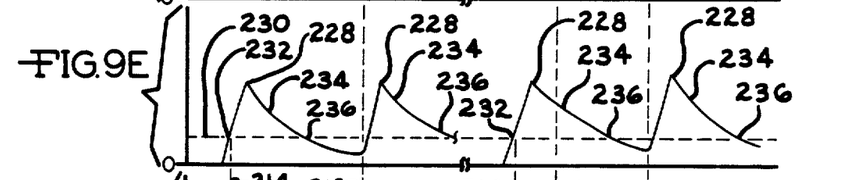
FIG. 9e shows the charge upon a second energy storage means when engine speed is below the predetermined value.

FIG. 9e shows the charge present on the second energy storage means, capacitor 146 when the associated engine is operated at a rotational speed below the predetermined rate of revolution. Capacitor 146 begins charging with the beginning of portion 204 of waveform 200, 202, and charges to a voltage value 228 at the peak amplitude of portion 204, reaching the threshold level of 230 of shunting means 162 at point 232, prior in time to time 214. A trigger signal is provided to control terminal 132 at this time. This is not significant, because there is no energy stored in capacitor 94 at this time. Capacitor 146 then discharges along path 234, falling below threshold level 230 at point 236, which is prior in time to time 218, so that shunting means 162 will be nonconductive and allow the transmission of a trigger signal to switching means 134 to provide an ignition impulse at time 218. Again, during waveform portion 208, capacitor 146 charges, and decays along path 234 to point 236, and is substantially fully decayed by the time of initiation of portion 204 of the second waveform 202. This process repeats indefinitely as long as the speed of the associated engine is below the predetermined rotational speed or rate.

Figure 9F:
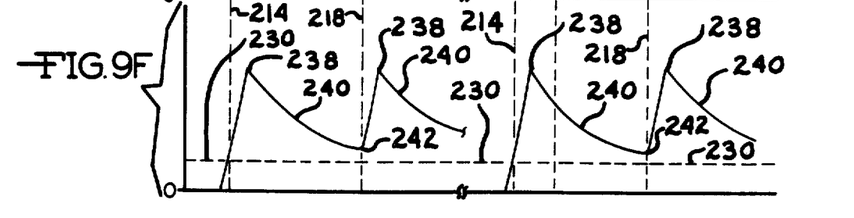
FIG. 9f shows the charge upon the second energy storage means at an engine speed above the predetermined value.

FIG. 9f illustrates the voltage appearing on capacitor 146 when engine speed is above the predetermined rotational speed or rate. In this case, due primarily to decrease in time per revolution, and also due to an increase in absolute values of induced voltage waveforms at higher engine speeds, capacitor 146 charges to a voltage value 238 during portions 204 and 208, and discharges along path 240 to a voltage level 242 which is greater than threshold level 230 at time 218, preventing the occurrence of an ignition impulse at time 218, so that the ignition impulse is rather provided at a subsequent time 214.

It will now be apparent that a time delay circuit according to the invention may be easily incorporated in numerous specific embodiments of capacitive discharge magneto ignition systems, and achieve a step advance function with a minimum of additional parts or components, here shown as a transistor, a capacitor, a resistor and a diode.

One specific embodiment in which the invention may be incorporated is analogous to that illustrated, having a two-leg core and a three pole magnet, rather than a three leg core and a two pole magnet as shown in the instant application. A three pole magnet is made by placing a two pole magnet on a flywheel with a first pole disposed radially outwardly, and a double ended pole shoe structure extending from the radially-inward pole of the magnet to the radial periphery of the flywheel on opposite sides of the magnet, producing a N-S-N or S-N-S sequence. Since similar waveforms are produced, the invention may be used to produce the same results and advantages.

As will be apparent to one skilled in the invention, numerous modifications of the invention in the precise arrangement of the circuitry for a capacitive-discharge magneto ignition system and in the types of components used will be apparent to one skilled in the art, and may be easily made without departing from the spirit and scope of the invention.

I claim:

1. An ignition system for an internal combustion engine having a rotatable flywheel means including magnet means for providing a rotating magnetic field, comprising:

a magnetic core means adapted to be mounted adjacent said flywheel means, said magnetic core means being an E-shaped core means having a first leg, a second leg and a third leg, each said leg having a free end disposed adjacent said flywheel means when said core means is mounted adjacent said flywheel means, said second leg being an intermediate leg;

a plurality of electrical windings disposed about said intermediate leg, said plurality of windings including a charging winding and a trigger winding;

a voltage waveform having a first portion, a second portion and a third portion being cyclically induced in said plurality of coils by said rotating magnetic field, said first portion and said third portion having a first polarity and said second portion having a second polarity, said second portion being temporally intermediate said first and third portions;

ignition coil means for providing an ignition impulse to said internal combustion engine; energy storage means for providing energy to said ignition coil means operably connected to and cyclically charged by said charging winding in response to said second portion of said voltage waveform;

switching means operably interposed between said ignition coil means and said energy storage means, said switching means being responsive to a predetermined voltage of said first and third portions of said voltage waveform for discharging said energy storage means into said ignition coil means to provide said ignition impulse;

said switching means having a first input terminal for controlling said switching means;

a shunting means connected to said first input terminal for shunting a trigger signal provided by said trigger winding to said first input terminal, said trigger winding being operably connected to said first input terminal and to said shunting means;

said shunting means being resistively connected to a second energy storage means;

said second energy storage means being operatively connected to said trigger winding and being cyclically charged thereby;

said shunting means having a threshold voltage and being rendered conductive when the voltage upon said second energy storage means exceeds a predetermined value;

said second energy storage means being cyclically at least partially discharged through said shunting means;

said second energy storage means being maintained at a voltage below said threshold voltage when said engine is operated below a predetermined rotational speed, said ignition impulse being provided during one said third portion, said shunting means being nonconductive;

said second energy storage means being maintained at a voltage above said threshold voltage during said second and third portions when said engine is operated above said predetermined rotational speed, said ignition impulse being provided during said first portion to provide an advanced ignition impulse, said shunting means being conductive during said second and third portions of a first said cyclically induced voltage waveform and becoming nonconductive between said first waveform and a second said waveform.

2. An ignition system according to claim 1, wherein: said switching means is a threshold latching means.

3. An ignition system according to claim 2, wherein: said threshold means is a silicon controlled rectifier.

4. An ignition system according to claim 1, wherein: said shunting means is a bipolar transistor.

5. An ignition system according to claim 1, wherein: said plurality of coils includes said ignition coil means, said ignition coil means including a primary winding and a secondary winding disposed about said intermediate leg.

6. An ignition system for an internal combustion engine having a rotatable means including magnet means for providing a rotating magnetic field, comprising:

a magnetic core means adapted to be mounted adjacent said flywheel means, said magnetic core means having at least two legs, each said leg having a free end disposed adjacent said flywheel means when said core means is mounted adjacent said flywheel means;

a plurality of electrical windings disposed on said core, said plurality of windings including a charging winding and a trigger winding;

a voltage waveform having a first portion, a second portion and a third portion being cyclically induced in said plurality of coils by said rotating magnetic field, said first portion and said third portion having a first polarity and said second portion having a second polarity, said second portion being temporally intermediate said first and third portions;

ignition coil means for providing an ignition impulse to said internal combustion engine; energy storage means for providing energy to said ignition coil means operably connected to and cyclically charged by said charging winding in response to said second portion of said voltage waveform;

switching means operably interposed between said ignition coil means and said energy storage means, said switching means being responsive to a predetermined voltage of said first and third portions of said voltage waveform for discharging said energy storage means into said ignition coil means to provide said ignition impulse;

said switching means having a first input terminal for controlling said switching means;

a shunting means connected to said first input terminal for shunting a trigger signal provided by said trigger winding to said first input terminal, said trigger winding being operably connected to said first input terminal and to said shunting means;

said shunting means being resistively connected to a second energy storage means;

said second energy storage means being operatively connected to said trigger winding and being cyclically charged thereby;

said shunting means having a threshold voltage and being rendered conductive when the voltage upon said second energy storage means exceeds a predetermined value;

said second energy storage means being cyclically at least partially discharged through said shunting means;

said second energy storage means being maintained at a voltage below said threshold voltage when said engine is operated below a predetermined rotational speed, said ignition impulse being provided during one said third portion, said shunting means being nonconductive;

said second energy storage means being maintained at a voltage above said threshold voltage during said second and third portions when said engine is operated above said predetermined rotational speed, said ignition impulse being provided during said first portion to provide an advanced ignition impulse, said shunting means being conductive during said second and third portions of a first said cyclically induced voltage waveform and becoming nonconductive between said first waveform and a second said waveform.

7. An ignition system according to claim 6, wherein: said switching means is a threshold latching means.

8. An ignition system acccording to claim 7, wherein: said threshold means is a silicon controlled rectifier.

9. An ignition system according to claim 6, wherein: said shunting means is a bipolar transistor.

10. An ignition system according to claim 6, wherein: said core means is an E-shaped core means having a first leg, a second leg and a third leg, said second leg being an intermediate leg;

said plurality of windings being mounted about said second leg.

* * * * *